United States Patent [19]

Chiavon

[11] E Patent Number: Re. 33,114

[45] Reissued Date of Patent: Nov. 21, 1989

[54] TAMPER-PROOF THREADED FASTENINGS

[76] Inventor: Ezio R. Chiavon, 17 Walnut La., Harrison, N.Y. 10528

[21] Appl. No.: 247,751

[22] Filed: Sep. 22, 1988 (Under 37 CFR 1.47)

Related U.S. Patent Documents

Reissue of:

[64] Patent No.: 4,616,535
Issued: Oct. 14, 1986
Appl. No.: 754,064
Filed: Jul. 11, 1985

U.S. Applications:

[63] Continuation of Ser. No. 476,031, Mar. 17, 1983, abandoned.

[51] Int. Cl.[4] ..... B25B 13/06

[52] U.S. Cl. ..... 81/121.1; 411/429; 411/910

[58] Field of Search ..... 81/176.15, 176.2, 461, 81/121.1; 411/410, 402, 427, 429, 910

[56] References Cited

U.S. PATENT DOCUMENTS

| | | | |
|---|---|---|---|
| 529,683 | 11/1894 | Herman | 411/429 X |
| 1,447,564 | 3/1923 | Norland et al. | 411/910 X |
| 2,040,383 | 5/1936 | Jasper | 411/429 X |
| 2,372,269 | 3/1945 | Golan | 81/121.1 |
| 3,222,976 | 12/1965 | Holman . | |
| 3,482,481 | 12/1969 | Newell et al. . | |
| 3,631,757 | 1/1972 | Perkin | 411/429 X |
| 3,695,124 | 10/1972 | Myers . | |
| 3,763,725 | 10/1973 | Reiland . | |
| 3,908,489 | 9/1975 | Yamamoto et al. . | |
| 3,930,428 | 1/1976 | Hale . | |
| 4,018,133 | 4/1977 | Chaivre et al. | 411/429 X |
| 4,027,572 | 6/1977 | Burge | 81/176.15 X |
| 4,521,146 | 6/1985 | Wharton | 411/429 X |

FOREIGN PATENT DOCUMENTS

| | | | |
|---|---|---|---|
| 557220 | 2/1973 | Switzerland | 81/121.1 |
| 943521 | 12/1963 | United Kingdom | 81/461 |

OTHER PUBLICATIONS

1979 American Accessories Catalog (Effective Dec. 1, 1978), Cover Sheet and p. 5.

*Primary Examiner*—James G. Smith
*Attorney, Agent, or Firm*—Chilton, Alix & Van Kirk

[57] ABSTRACT

The fastening device has a head portion with a uniform cross section, the uniform cross section having a plurality of non-uniform indentations. A matching socket wrench is provided having an internal cross section matching the exterior cross section of the fastening for tightening or loosening the fastening. The invention is particularly useful for preventing unauthorized removal of automobile wheels.

22 Claims, 4 Drawing Sheets

TAMPER-PROOF THREADED FASTENINGS

Matter enclosed in heavy brackets [ ] appears in the original patent but forms no part of this reissue specification; matter printed in italics indicates the additions made by reissue.

This application is a continuation of U.S. Ser. No. 476,031, filed Mar. 17, 1983, now abandoned.

BACKGROUND OF THE INVENTION

This invention relates to screw threaded fastening devices which are designed for removal only by authorized persons. The invention is particularly useful as a lug fastener for an automobile wheel to prevent unauthorized removal of the fastener and theft of the wheel.

Tamper-proof threaded fastenings are very much in demand, especially for automobile wheels. The so-called "mag" wheels for sport cars are especially vulnerable to theft, and are very costly, and therefore attractive to thieves.

A number of products are now offered to "lock" automobile wheels to the wheel hubs. One of the most popular designs for these wheel locks is offered by an organization called "McGard" of Buffalo, N.Y. The McGard locking devices consist of a set of four special lug nuts or lug bolts together with a special "key" wrench. One special lug nut or bolt is used for each wheel of an automobile. Each lug nut or lug bolt has an enlarged head with a shaped annular channel in the outer axial end of the head designated to receive the special key wrench. The annular channel has an irregular shape, and the key wrench has a corresponding matched irregular annular shape. The annular channel in the head is fairly shallow, and the channel is of substantially uniform width, which is apparently cut out by a routing tool. This device has a number of very important disadvantages and problems as follows:

The enlarged head of the fastener has a substantially greater weight than the conventional lug fasteners used on the same wheel. This tends to unbalance the wheel for high speed operation. That is a substantial disadvantage for a high performance automobile. The McGard organization recognizes this disadvantage because it recommends that the wheels be balanced with the fasteners in place on each wheel, and that the locking fastener then be carefully mounted on the wheel in the exact position where the locking fastener appeared at the time of balancing.

Another important disadvantage is that the McGard locking fastener has a substantially different appearance from the other lug fasteners for the wheel. This is a very important disadvantage to the automobile owner who has often made a considerable investment in special wheels to achieve the ultimate in appearance for his automobile.

Another disadvantage emphasized by McGard is that power torque wrenches must not be used for tightening the McGard locking fastener on the wheel without damaging the locking fastener, or to the key wrench, or both. A corollary of this disadvantage is that the locking fastener simply cannot be tightened as much as the other convenient lug fasteners on the wheel. This means that the locking fastener does not do its proportionate share of holding the wheel on the hub of the automobile, and may be more easily subject to unintentional loosening. If the locking fastener comes loose, it cannot perform its function as a lock.

Still another important disadvantage of the prior locking fastener is the extreme difficulty in engaging the key wrench into the annular channel in the locking fastener. This is an important disadvantage, particularly if tires must be changed quickly on the road in the dark, or under adverse conditions.

Accordingly, the objects of the present invention include separately, and collectively, overcoming or minimizing each of the above mentioned disadvantages and problems encountered with the prior art locking devices.

Further objectives and advantages of the invention will be apparent from the following description and the accompanying drawings.

SUMMARY OF THE INVENTION

In carrying out the invention there is provided a tamper-proof screw threaded fastening device having a substantially cylindrical head portion, said head portion including at least three axially aligned grooves extending radially inwardly from the outer circumference thereof, said head portion with said grooves being adapted to receive a special socket wrench including radially inwardly extending ribs for engagement with said grooves.

DESCRIPTION OF PREFERRED EMBODIMENTS

Figure 1:
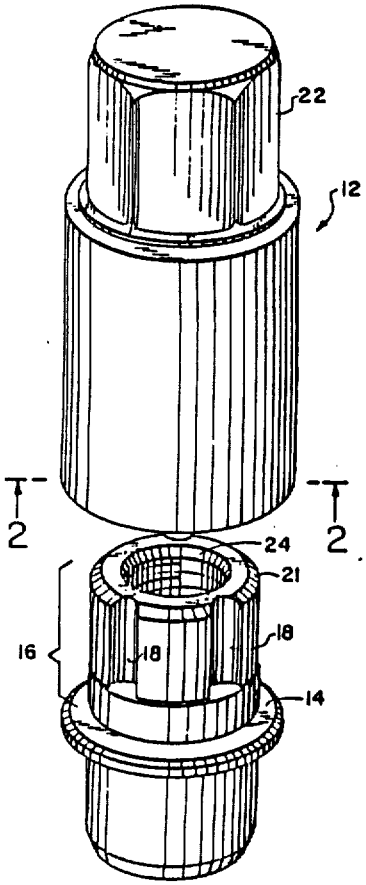
FIG. 1 is an exploded view illustrating a tamper-proof screw threaded fastening device in accordance with the present invention together with a special socket wrench for tightening and loosening that fastening device.

FIG. 1 is an exploded view illustrating a tamper-proof, screw threaded fastening device 10, in accordance with the present invention, together with a special socket wrench 12 designed to tighten or loosen the device 10. The device 10 is essentially a threaded nut, which may be used as one of the lug nuts for securing an automobile wheel to the wheel hub. The invention also contemplates threaded fastenings which are bolts to be described later.

The body of the present device 10 preferably includes a flange 14 and a head portion 16. Head portion 16 preferably has a substantially cylindrical shape, with axially aligned grooves or indentations 18 which extend radially inwardly from the circumference of the head portion. The grooves 18 are adapted to receive corresponding ribs in the interior of the socket wrench 12. The ribs are shown at 20 in FIG. 2 which is a bottom view of the socket wrench 12.

The grooves 18 and the ribs 20 are preferably non-uniform for each set of tamper-proof screw threaded fastening devices with the associated socket wrench. Typically, the screw threaded devices are provided in sets of four, with a single socket wrench which fits all four, so that one threaded fastening may be used on each wheel of an automobile to prevent theft of the wheels.

Ideally, each owner has a unique set of fastening devices and a unique wrench, and one owner's wrench will not be capable of loosening the fastening devices of another owner. Practically, it may not be possible to provide so many different configurations of the exterior profiles of the heads of the fastening devices, and the corresponding internal profiles of the socket wrenches, to provide every owner with a unique profile. However, it is possible to provide such a large number of different profiles that it is very unlikely that two owners who have identical wrenches will encounter one another. There are a number of ways in which the grooves may be made non-uniform, including a non-uniform circumferential spacing of the grooves, non-uniform sizes in the grooves, non-uniform shapes in the grooves, a non-uniform number of grooves, and combinations of such non-uniformities.

It has been found, for instance, that with five grooves or indentations, it is easily possible to provide as many as 120 unique groove arrangements simply by moving the grooves to different relative circumferential positions without changing the shape or size of the grooves. By also changing sizes and shapes and numbers of the grooves, it is possible to produce thousands of unique combinations. The grooves 18 are generally arcuate in shape. As illustrated in the drawing, the head portion 16 is substantially uniform in cross section over substantially the entire axial length, and the grooves 18 extend through that substantial length. The grooves 18 may also be referred to more generally as indentations, and may be present in any desired number and have any desired shape. However, preferably there are provided at least three grooves or indentations, and preferably five or seven, but preferably no more than seven. It is preferred to employ an odd number of grooves or indentations in order to discourage the unauthorized removal of the fastening device by means of a pipe wrench or a locking type of wrench. In any case, it is preferred to avoid having two grooves or indentations positioned diametrically opposite to one another, which would give a better purchase for a pipe wrench or a locking wrench.

The head portion 16 of the fastening device preferably has a substantially uniform cross section over substantially the entire axial length.

The wrench 12 of FIG. 1 preferably includes a conventional hexagonal shaped head portion 22 for receiving a standard hand wrench or power wrench.

The fastening device 10 is basically a threaded nut, which has standard interior screw threads 24 extending all the way through.

Figure 3:
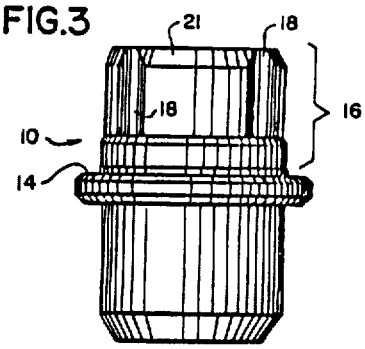
FIG. 3 is a side view of the threaded fastening device of FIG. 1.

FIG. 3 is a side view of the fastening device 10 of FIG. 1.

Figure 2:
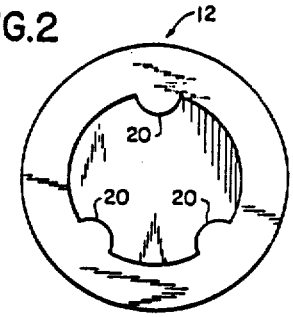
FIG. 2 is a bottom view of the socket wrench of FIG. 1.
Figure 4:
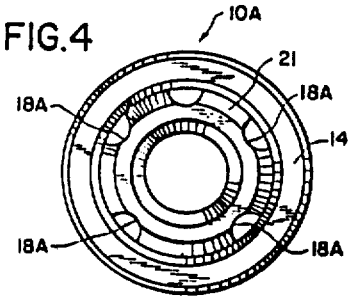
FIG. 4 is a top view of a modified embodiment of the threaded fastening device of FIG. 1.

FIG. 4 is a top view of a modification of the fastening device of FIGS. 1, 2, and 3, in which five grooves 18A are provided instead of the three grooves 18.

Figure 5:
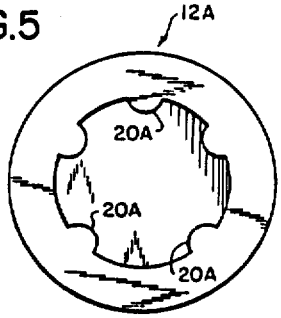
FIG. 5 is a bottom view, corresponding to FIG. 2, of a socket wrench for the modified threaded fastening device of FIG. 4.

FIG. 5 is a bottom view, corresponding to the bottom view of FIG. 2, of a modification 12A of the wrench 12 in which five ribs 20A are provided instead of three, the ribs 20A being arranged to fit within the grooves 18A.

Figure 6:
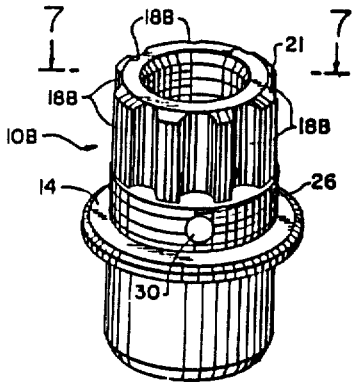
FIG. 6 is a perspective view of a modified embodiment of the threaded fastening of FIG. 1 including exterior threads for receiving a decorative cap.
Figure 9:
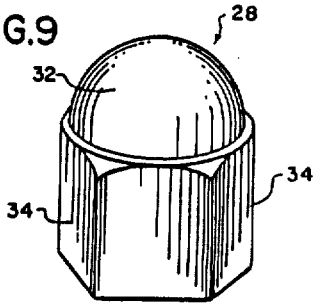
FIG. 9 is a perspective view of a decorative cap for the fastening device of FIG. 6.

FIG. 6 is a perspective view of another modification of the fastening device of FIG. 1 in which exterior threads are provided at the lower part of the head portion, as indicated at 26. The threads 26 are for the purpose of receiving and retaining a decorative cap 28 illustrated in FIGS. 9 and 10, and the cap is shown assembled over the head of the fastening device in FIG. 11.

Figure 7:
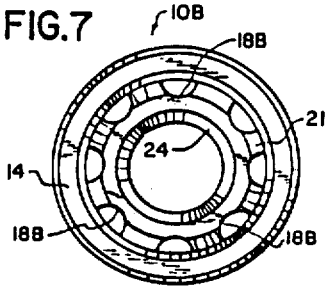
FIG. 7 is a top view of the embodiment of FIG. 6.

The embodiment of FIG. 6 is different in another respect from the embodiment of FIG. 1, in that seven grooves are provided instead of three. These seven grooves 18B are clearly shown in FIG. 7, which is a top view of the embodiment of FIG. 6.

Another important and useful preferred feature of the embodiment of FIG. 6 is the provision of a plug 30 of a synthetic resin material such as a nylon, which is inserted into a receiving opening in the threads 26. The plug protrudes slightly into the area of the threads, beyond the grooves between the threads, but not above the tips of the threads, so that the plug provides a slight interference with the mating threads on the cap 28 to maintain the cap in the assembled position after it has been tightened in place.

Figure 8:
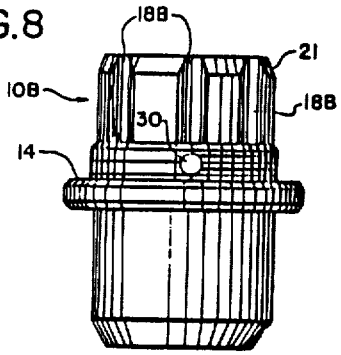
FIG. 8 is a side view of the embodiment of FIG. 6.

FIG. 8 is a full side view of the embodiment of FIG. 6 which is included to more completely display the features of the embodiment of FIG. 6.

As previously mentioned above, FIG. 9 is a perspective view of a decorative cap 28 which is intended to be assembled over the head of the fastener of FIG. 6. This cap includes a hex portion 24 and a domed top 32.

Figure 10:
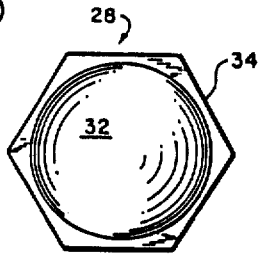
FIG. 10 is a top view of the decorative cap of FIG. 9.

FIG. 10 is a top view of the decorative cap 28, and is included to further illustrate the features of that cap.

Figure 11:
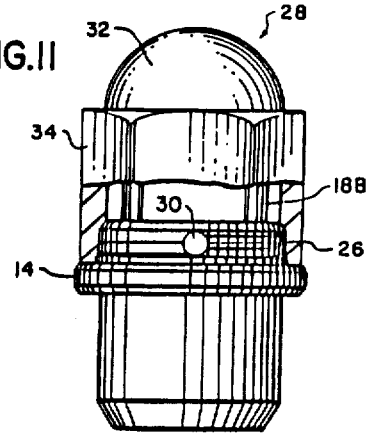
FIG. 11 is an assembled view, partially in section, illustrating the decorative cap of FIG. 9 assembled to the fastening device of FIG. 6.

FIG. 11 illustrates the assembled combination of the fastening device 10B of FIG. 6 with the decorative cap 28. The cap 28 is shown partially in section in order to illustrate how the cap is fastened over the head portion of the fastening device, and with its lower edge tightened down against the flange 14. It is one of the important features of the present invention, that when the cap 28 is in place over the head of the fastening device 10B, the combination presents an exterior appearance which is identical to the appearance of a corresponding standard lug nut of the non-tamper-proof variety with which the present fastening is intended to be employed. Thus, in a typical application, one of the tamper-proof threaded fastenings of the present invention will be used on each wheel together with three or four standard lug nuts which have the same identical appearance.

Not only is the appearance the same as the standard lug nut for the corresponding automobile make and style, but the weight is identical to the standard lug nut so that there is no problem of wheel imbalance because of the use of the tamper-proof threaded fastening of the present invention.

It will be understood that the threaded fastenings of the present invention may be made in many different configurations to correspond in finished exterior appearance (with decorative caps in place) to various different makes and models of lug nuts for different automobiles. The particular configuration illustrated in FIG. 11 corresponds closely to the lug nuts which are used, for instance, with the current Toyota sports cars which are sold under the model names "CELICA", "SUPRA" and "XL-5".

It will be understood that the threaded cap feature of FIGS. 7 through 11 can be used with any of the groove configurations illustrated in FIGS. 1 through 5.

The principles of the invention described above are applicable also to the production of tamper-proof threaded fastenings in the form of bolts.

Figure 12:
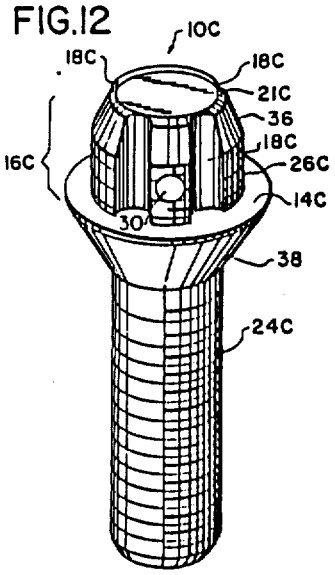
FIG. 12 is a perspective view of a lug bolt embodiment of the threaded fastening device of the invention.

FIG. 12 illustrates a lug bolt 10C in accordance with the invention which is especially designed for use in locking BMW automobile wheels in place. The bolt device includes grooves 18C in the head portion 16C.

The outer tip of the head portion 16C preferably includes a beveled edge 21C for automatic centering and ease of positioning the associated wrench. Additionally, there is a slight bevel or cone-shape to the next succeeding head surface 36 extending between the adjacent slots 18C. This too, assists in centering the socket wrench as it is moved into position over the head of the fastening device. Another modification from the prior embodiments is the provision that the grooves 18C extend downwardly, all the way to the flange 14C, and through the threads 26C for a decorative cap. This provides for better coupling of the wrench with the head 16C of the threaded fastening, and it is especially desirable for smaller diameter threaded fastening heads, which are more typical with lug bolts than with lug nuts.

The threads 26C are quite effective for the attachment of a decorative cap, even though those threads are interrupted by the grooves 18C.

In addition to a threaded bolt body portion 24, the bolt 10C includes a tapered cone portion indicated at 38.

Again, a nylon plug 30 is provided in the path of the threads 26C in order to lock a decorative cap in place over the head of the bolt.

Figure 13:
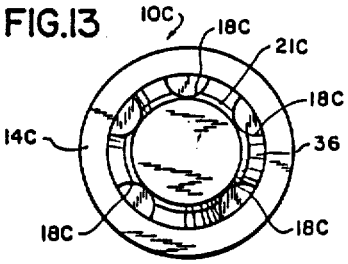
FIG. 13 is a top view of the embodiment of FIG. 12.

FIG. 13 is a top view of the embodiment of FIG. 12, and shows that five grooves 18C are provided.

Figure 14:
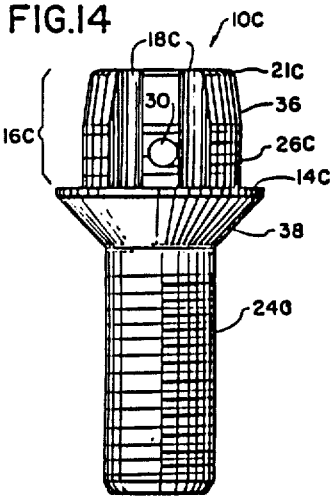
FIG. 14 is a side view of the embodiment of FIG. 12.

FIG. 14 is a side view of the embodiment of FIG. 12, and is included to more completely illustrate the features of this embodiment.

Figure 15:
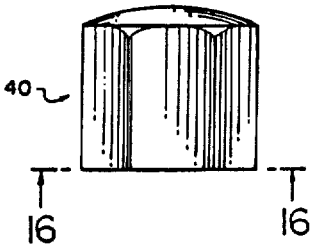
FIG. 15 is a side view of a decorative cap for the embodiment of FIG. 12.

FIG. 15 is a side view of a decorative cap 40 for the head of the threaded fastening of FIG. 12.

Figure 16:
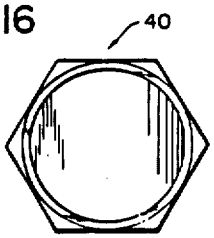
FIG. 16 is a bottom view of the decorative cap of FIG. 15.

FIG. 16 is a bottom view of the cap of FIG. 15.

Figure 17:
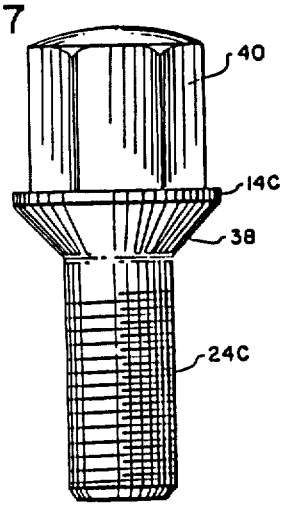
FIG. 17 is a view of the embodiment of FIG. 12 with the cap of FIG. 15 assembled thereto.

FIG. 17 is an assembled view showing the cap 40 in place over the head of the bolt of FIG. 12. This combination of the bolt 10C with the decorative cap 40 provides an appearance which is substantially identical to the appearance of the standard lug bolts used to hold BMW wheels on the wheel hubs.

Figure 18:
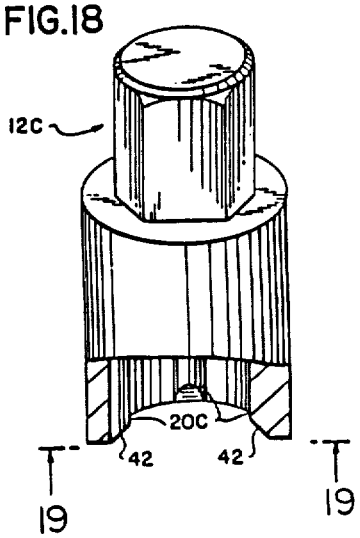
FIG. 18 is a perspective view, partially in section, of a socket wrench for use with the embodiment of FIG. 12.

FIG. 18 is a view, partially in section, of a special socket wrench 12C for use with the bolt embodiment of FIG. 12. The wrench is partially sectioned in the bottom portion to illustrate the construction of the ribs 20C which are meant to engage in the slots 18C. In particular, the ends of the ribs 20C at the mouth of the socket wrench are preferably tapered at 42 in order to provide for automatic centering of the socket wrench over the head of the bolt until the socket wrench is rotated to the exact position where it will fully engage over the head of the bolt.

Figure 19:
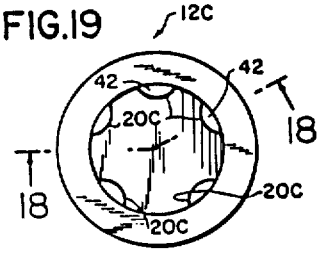
FIG. 19 is a bottom view of the wrench of FIG. 18.

FIG. 19 is a bottom view of the wrench of FIG. 18, again showing the ribs 20C and the tapered rib ends 42.

Figure 20:
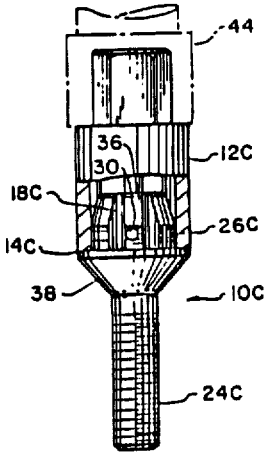
FIG. 20 is an assembly view, partly in section, showing how the socket wrench of FIG. 18 engages with the head of the lug bolt embodiment of FIG. 12.

FIG. 20 illustrates an assembled view, partly in section, showing the wrench 12C fully engaged with the bolt 10C of FIG. 123, and also indicating in phantom the head of a power wrench 44 engaged with the wrench 12C.

Figure 21:
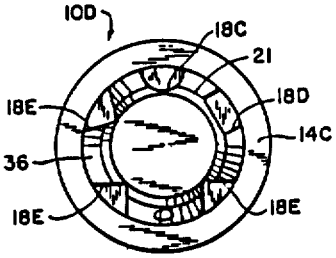
FIG. 21 is a top view of an alternative embodiment of the fastening device of FIG. 12 illustrating the use of grooves of different shapes.

FIG. 21 is a top view, corresponding to the top view of FIG. 13, illustrating a modification of the invention in which slots of different shapes are employed. In addition to one slot 18C of arcuate shape, there is a slot 18D having three straight sides, and three slots 18E having a V-shape with two substantially straight sides. This serves to illustrate how the shapes of the slots can be varied to provide indentations having various different shapes. It will be understood that all of the slots in a particular threaded fastening may have the same shape, or they may have different shapes in order to establish different "combinations", each of which will be fitted by only one special wrench.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. An anti-theft fastening device for securing an automobile wheel to a vehicle, said fastening device including a head portion defining a predetermined configuration on the outer periphery thereof adapted to complement the configuration of a tool for removing said head portion from an automobile wheel, and a cap [removable] *removably* mounted over said head portion to conceal said predetermined configuration defined on said head portion, the combined weight of *the fastening device including* said head portion and said cap being substantially equal in weight to the weight of conventional lug nuts mounted to said automobile wheel.

2. The device as claimed in claim 1 wherein said cap is designed to resemble the configuration of said conventional lug nuts mounted to said automobile wheel.

3. The device as claimed in claim 1 wherein screw threads are defined on at least part of the outer periphery of said head portion and on at least part of the inner surface of said cap for screwing said cap over said head portion.

4. The device as claimed in claim 1 wherein said predetermined configuration on said head portion is defined by a plurality of indentations.

5. A fastening device as claimed in claim 4 wherein an odd number of at least three of said indentations are provided.

6. A fastening device as claimed in claim [5] *4* wherein said indentations are non-uniform from one set of fastening devices to another.

7. A fastening device as claimed in claim [6] *4* wherein said [non-uniform] indentations are non-uniform in the sense that the circumferential spacing of said indentations is non-uniform.

8. A fastening device as claimed in claim [6] *4* wherein said [non-uniform] indentations are non-uniform in size.

9. A fastening device as claimed in claim [6] *4* wherein said [non-uniform] indentations are non-uniform in number.

10. A fastening device as claimed in claim [6] *4* wherein said [non-uniform] indentations are non-uniform in shape.

11. A fastening device as claimed in claim [6] *4* wherein said [non-uniform] indentations are non-uniform both in spacing and in size.

12. A fastening device as claimed in claim [6] *4* wherein said [non-uniform] spacing and shape.

13. A fastening device as claimed in claim [6] *4* wherein said [non-uniform] indentations are comprised of grooves.

14. A fastening device as claimed in claim 13 wherein said grooves have a substantially V-shaped cross section.

15. A fastening device as claimed in claim 13 wherein said grooves have an arcuate cross section.

16. A fastening device as claimed in claim 6 in combination with a socket wrench for engagement over the head of said fastening device and having radially inwardly extending protrusions arranged and adapted for engagement within said indentations in said head portion of said fastening device.

17. A fastening device as claimed in claim 1 wherein said cap is metallic.

18. A fastening device as claimed in claim 17 wherein said cap is aluminum.

19. A fastening device as claimed in claim 1 wherein the bottom of said head portion defines a radial flange having a larger diameter than that of said cap.

*20. An anti-theft lug fastener for a vehicle wheel to be used in place of a standard threaded lug fastener of the type adapted to receive a standard lug wrench for rotation thereof for installation and removal, the anti-theft lug fastener comprising a threaded lug fastener body, the lug fastener body having a generally circular head portion with an annular arrangement of a plurality of angularly spaced and axially extending peripheral grooves non-uniformly angularly spaced to receive a non-standard lug wrench for rotation of the lug fastener body for installation and removal, the lug fastener body having an externally threaded portion and the anti-theft lug fastener further comprising an internally threaded outer end cap threadably mounted on said threaded portion to conceal an outer end portion of the lug fastener body including said head portion, the lug fastener cap having an external appearance simulating the external appearance of a corresponding outer end portion of said standard lug fasteners provided for certain vehicles, the weight of the anti-theft lug fastener, including the weight of the lug fastener body and the lug fastener cap, being substantially the same as the weight of a said standard lug fastener for said vehicles.*

*21. An anti-theft lug fastener according to claim 20, wherein the lug fastener cap has a portion with an exterior hexagonal shape simulating being adapted to receive a standard lug wrench for rotation of the anti-theft lug fastener for installation and removal.*

*22. An anti-theft lug fastener for wheels of certain vehicles to be used in place of a standard threaded lug fastener for said wheels of the type adapted to receive a standard lug wrench for rotation thereof for installation and removal, the anti-theft lug fastener comprising a threaded lug fastener body, the lug fastener body having a generally circular head portion with an annular arrangement of a plurality of angularly spaced and axially extending peripheral grooves non-uniformly configured to receive a non-standard lug wrench for rotation of the lug fastener body for installation and removal, the lug fastener body having an externally threaded portion and the anti-theft lug fastener further comprising an internally threaded outer end cap threadably mounted on said threaded portion to conceal an outer end portion of the lug fastener body including said head portion, the lug fastener cap having an external appearance simulating the external appearance of a corresponding outer end portion of said standard lug fastener for said vehicles, the weight of the anti-theft lug fastener, including the weight of the lug fastener body and the lug fastener cap, being substantially the same as the weight of a said standard lug fastener for said vehicles.*

* * * * *